Patented June 24, 1941

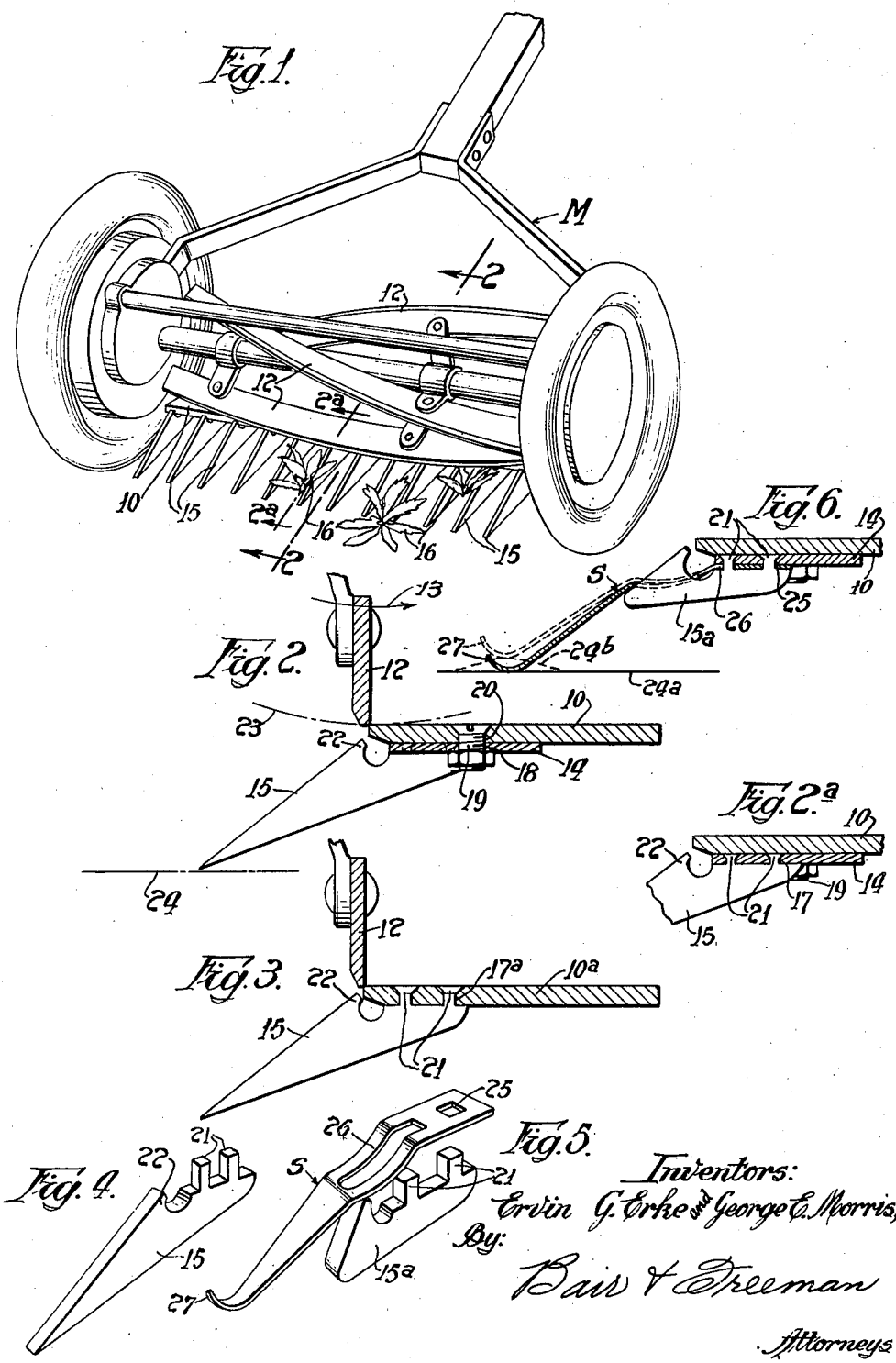

2,246,880

UNITED STATES PATENT OFFICE 2,246,880

LEAF PICKUP DEVICE FOR LAWN MOWERS

Ervin George Erke and George Eustace Morris, St. Paul, Minn.

Application September 11, 1939, Serial No. 294,350

2 Claims. (Cl. 56—294)

An object of our invention is to provide a simple and inexpensive leaf pick-up device for lawn mowers which may be made either in the form of an attachment for the ledger bar of an existing lawn mower or built up as part of the ledger blade itself.

Another object is to provide a leaf pick-up device which includes a plurality of laterally spaced teeth extending forwardly and downwardly from the ledger blade of a lawn mower and pointed at their forward ends, the forward ends being relatively close to the ground surface and adapted thereby to effectively pass under any leaves such as plantain and dandelion leaves, and elevate them up inclined edges of the teeth to a position in the path of movement of the reel blade.

Still another object is to provide inexpensive leaf pick-up teeth for a lawn mower formed of substantially triangular plates having each a pair of projections from one side of the triangle riveted in openings of the ledger bar or a supporting plate adapted to be attached to the lower surface of the ledger bar of a lawn mower.

Still a further object is to provide projections on the plate-like teeth at the apex of the triangle which terminate immediately below the path of the reel blade and are effective to raise leaves to a point where they may be readily cut by the reel blades.

With the foregoing and other contemplated as well as obvious objects in view, the invention comprises the combination of elements and arrangement of parts so combined as to coact and cooperate with each other in the performance of the functions and the accomplishment of the results herein contemplated, and comprises in one of its adaptations the species or preferred form illustrated in the accompanying drawing, wherein:

Figure 1 is a perspective view of a lawn mower with our leaf pick-up device installed thereon;

Figure 2 is an enlarged sectional view on the line 2—2 of Figure 1;

Figure 2a is a sectional view on the line 2a—2a of Figure 1;

Figure 3 is a view similar to Figure 2 showing a modified construction in which the leaf pick-up teeth are mounted directly on the ledger bar;

Figure 4 is a perspective view of one of the leaf pick-up teeth of our invention;

Figure 5 is an exploded perspective view of another modification of the invention, and Figure 6 is a view similar to Figure 2a showing the modification of Figure 5 partially in section.

On the accompanying drawing we have used the reference character M to indicate generally a mower. The mower M is of conventional type including a ledger bar 10 and a reel having reel blades 12. The ledger bar 10 and the reel blades 12 coact as in Figure 2 when the reel rotates in the direction of the arrow 13 for cutting grass.

Heretofore it has been difficult to cut leaves such as those found on plaintain and dandelions with a lawn mower because such leaves have a tendency to lie close to the ground, whereas grass on the other hand projects upwardly from the ground and may be readily cut.

Accordingly, we provide a leaf pick-up device consisting of a supporting bar 14 and a plurality of teeth 15 arranged with relation to the ledger bar 10 as shown in Figure 1 so that leaves as indicated at 16 will be picked up by the teeth and fed into the reel for being cut thereby.

The supporting bar 14 is provided with pairs of openings 17 and with two or more openings 18. The openings 18 are adapted to receive bolts 19 which extend through openings 20 in the ledger bar 10 for the purpose of fastening the supporting bar 14 to the ledger bar.

Each tooth 15 consists of a flat substantiallly triangular shaped plate having a pair of projections 21 from one side of the triangle. These projections extend into the openings 17 and are countersunk riveted therein as illustrated in Figure 2a. A projection 22 is located on each plate immediately below the path of the blade 12, which path is indicated at 23. (See Figure 2.) The teeth 15 project downwardly and forwardly from the ledger blade 10 to a position adjacent the ground surface 24.

Accordingly, as the lawn mower M advances, the teeth 15 engage the leaves 16 and elevate them along the inclined upper edges of the teeth, the portions 22 finally guiding the leaves into the cutting zone of the blade 12. Thus, all leaves encountered by the mower are effectively lifted from the ground and cut by the mower when our attachment is used.

In Figure 3 we illustrate a modification in which the tooth 15 is secured directly to a ledger bar 10a. The ledger bar 10a is provided with openings 17a directly receiving the projections 21 of the teeth which are then riveted relative to the ledger bar.

In this type of installation the extra supporting bar 14 is not needed.

The teeth 15 may be readily stamped out of flat bar stock and the matter of assembling them relative to the supporting bar 14 or the ledger bar 10a is a comparatively simple operation requiring but little time.

Accordingly, our leaf pick-up device may be made economically and sold at a relatively low price. As far as performance is concerned, the teeth 15 serve as a very effective means to pick up all down leaves which they encounter and guide them to the cutting zone of the reel.

In Figure 5 we show a modification in which a tooth member 15a is made shorter than illustrated in Figure 4 and has a spring tooth portion S. The tooth S is made of a leaf spring having perforations 25 and 26 fitting over the projections 21 which are later riveted in the supporting bar 14, as in Figure 6. The perforation 26 at its forward edge rests on top of the front end of the tooth 15a, as shown in this figure, and when an obstruction is met such as the hump 24b in the normally level ground surface 24a, the tooth may spring upwardly instead of gouging into the ground. The forward end of the tooth S is turned upwardly at 27 to accomplish this result.

Having described three specific embodiments of our invention together with the operations thereof, we desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto.

We claim as our invention and desire to secure by Letters Patent of the United States:

1. In a leaf pick-up device for a lawn mower having a ledger bar, a plurality of laterally spaced rigid teeth supported by said ledger bar, said teeth having rearwardly and upwardly inclined upper edges terminating at their upper ends adjacent and in front of the forward edge of the ledger bar immediately below the path of the reel blade and having forwardly and downwardly inclined spring blade portions forming continuations of the forward ends of said rigid teeth and terminating at their lower ends adjacent the ground, said portions having sufficient resiliency to spring upwardly when striking the ground.

2. In a leaf pick-up device for a lawn mower having a ledger bar, a plurality of laterally spaced rigid teeth supported by said ledger bar, said teeth having upper inclined projections terminating at their upper ends adjacent and in front of the forward edge of the ledger bar immediately below the path of the reel blade and having spring blades forming forwardly and downwardly extending continuations of the forward ends of said rigid teeth, said spring blades at their rear ends overlying the forward ends of said rigid teeth and said projections effecting guidance of material to said reel and ledger bar after the material leaves said spring blades, said spring blades being springable upwardly from said rigid teeth upon striking an obstruction.

ERVIN GEORGE ERKE,
GEORGE EUSTACE MORRIS.